United States Patent [19]

Hatch

[11] 4,080,845

[45] Mar. 28, 1978

[54] SHAPED DISC FLYWHEEL

[75] Inventor: Burton D. Hatch, Ballston Lake, N.Y.

[73] Assignee: General Electric Company, Schenectady, N.Y.

[21] Appl. No.: 724,403

[22] Filed: Sep. 17, 1976

[51] Int. Cl.² ............................................. F16C 15/00
[52] U.S. Cl. ........................................ 74/572; 74/574
[58] Field of Search ......................... 74/572, 573, 574; 310/74

[56] References Cited

U.S. PATENT DOCUMENTS

| | | | |
|---|---|---|---|
| 2,539,730 | 1/1951 | Defosse | 74/572 |
| 2,995,938 | 8/1961 | Brodersen et al. | 74/572 X |
| 3,296,886 | 1/1967 | Reinhart, Jr. | 74/572 |
| 3,602,066 | 8/1971 | Wetherbee, Jr. | 74/572 |
| 3,672,241 | 6/1972 | Rabenhorst | 74/572 |
| 3,737,694 | 6/1973 | Rabenhorst | 74/572 X |
| 3,788,162 | 1/1974 | Rabenhorst et al. | 74/572 |
| 3,964,341 | 6/1976 | Rabenhorst | 74/572 |
| 3,982,447 | 9/1976 | Rabenhorst | 74/572 |

*Primary Examiner*—Samuel Scott
*Assistant Examiner*—Don E. Ferrell
*Attorney, Agent, or Firm*—Leo I. MaLossi; Joseph T. Cohen; Jerome C. Squillaro

[57] ABSTRACT

A composite flywheel is shown with concave or conical shapes or combination thereof. Upon rotation at a predetermined speed, the surfaces of the flywheel tend to flatten with a resultant increase in radius measured from the axis of rotation. Such an increase in radius while permitting the disc to flatten has the effect of substantially eliminating radial stresses within the flywheel. A method of forming such a flywheel from commercially available preimpregnated fiber or tapes is also disclosed.

39 Claims, 9 Drawing Figures

SHAPED DISC FLYWHEEL

BACKGROUND OF THE INVENTION

1. Field of the Invention

This invention relates to flywheels adapted for the storage of energy and more particularly to such flywheels having a composite construction.

2. Description of the Prior Art

Recently, there has been a revival in the engineering and scientific interest in flywheels. This owes to the fact that flywheels provide an efficient means of energy storage with no adverse environmental impact. Flywheels may be useful as means for energy storage in solar energy systems, mechanical power systems, and electrical power systems. For example, electrical utilities may employ flywheels as a means of storing energy required for times of peak loading. Flywheels may also be useful as means for storing energy for propulsion and auxiliary power in air, land, sea and space vehicles.

Flywheels function by storing kinetic energy. The amount of energy capable of being stored in a particular flywheel is a function of the mass of the flywheel, the distribution of mass within the flywheel, and the maximum allowable speed of rotation of the flywheel. However, the maximum allowable speed of rotation of a flywheel is limited by the strength of the material from which the flywheel is formed. That is, as the rotational speed of a flywheel increases, the internal stresses within the flywheel also increase, which stresses, if allowed to exceed certain limits, would cause the flywheel to break apart or fracture. It is apparent that optimally, flywheels should be constructed from materials having high strength-to-weight ratios.

Hereinbefore, prior art flywheels for the most part have proven unsatisfactory in meeting energy storing requirements within certain constraints of mass and volume. For example, many prior art flywheels comprise discs or solid cylindrical members formed from a homogeneous metal and rotatable about the central axes thereof. Although these homogeneous metal flywheels are formed from high strength materials, the strength-to-weight ratios available in metals and the fracture mechanics of metals under cyclic fatigue conditions severely limit the energy storage capability of the flywheel. Therefore, these prior art metal flywheels tend to be quite heavy. Moreover, should such prior art metal flywheel rupture, pieces breaking off the ruptured flywheel would possess sufficient energy to seriously damage equipment or injure persons in the vicinity. Such prior art metal flywheels are primarily useful where there are no size or weight constraints and where precautions have been taken ot insure the safety of persons or machinery in the area of the flywheel.

To overcome these disadvantages associated with prior art metallic flywheels, composite flywheels were developed. These composite flywheels are normally fabricated from a multiplicity of glass or similar fibers disposed in a matrix or binder of epoxy or any other suitable resin. Such composite flywheels are generally of a high strength-to-density ratio and therefore, to be able to store sufficient amounts of energy, may be required to rotate at extremely high speeds such as tens of thousands of revolutions per minute. These prior art composite flywheels have for the most part been formed by a circumferential distribtution of the fibers within the binder or matrix in the form of flat cylinders or spoke-mounted rings. Since, when a body rotates it is subject to stresses due to centrifugal force in a radially outward direction, such prior art composite flywheels must carry a significant portion of this centrifugal stress in directions normal to the axes of the circumferential fibers from which it is formed, placing the resin matrix in tension. Epoxy, elastomers, and other resins employed with composite flywheels are relatively weak when loaded in tension as compared to the strengths of the fibers. Therefore, a high rotational speed of such a composite flywheel can cause the flywheel to break apart along circumferential lines between the fibers from which it is formed.

Normally a flywheel must be apertured at a central portion thereof to accommodate bolts or other members for mounting the flywheel to a hub or shaft. Such apertures introduce stress concentrations in areas of the flywheel immediately adjacent thereto, substantially weakening the flywheel at these locations. Moreover, due to the mass and weight of the flywheel itself, the centrifugal loading of a prior art flywheel is most severe in these central portions, thereby limiting the rotational speed capability and thus the energy storage capability of the flywheel.

Therefore, it is an object of the present invention to provide a flywheel configuration suitable for use with either composite or isotropic materials wherein centrifugal loading is primarily carried along circumferential directions, reducing levels of stress and strain in the central portion of the flywheel and permitting the direct mounting of the flywheel to shafts or hubs without the rotational speed capability of the flywheel being limited by conditions at the area.

It is another object of the present invention to provide a composite flywheel capable of storing requisite amounts of energy within constraints of limited weight and volume.

It is another object of the present invention to provide a composite flywheel wherein the risk of radial delamination or fracture under high rotational speeds is minimized.

It is another object of the present invention to provide a composite flywheel in which the centrifugal forces are carried by high strength fibers without imposing high loading upon matrix material in which the fibers are located.

SUMMARY OF THE INVENTION

These and other objects apparent from the following detailed description taken in connection with the appended claims and accompanying drawings are attained by providing a composite flywheel having either a concave (dish-like) or conical shape or a combination of conical shapes. Therefore, in this context, "concave" is used to indicate a curved hollow shape and is not limited to any particular shape such as spherical or elliptical shapes. Upon rotation at a predetermined speed, the shaped flywheel of the present invention tends to flatten due to a component of centrifugal force normal to the flywheel surface. This flattening effects a resultant increase in the radius of the flywheel as measured radially outwardly from the axis of rotation in a direction perpendicular to the axis. Such an increase in radius compensates for and eliminates any elongation of the flywheel material itself due to centrifugal stresses. That is, the increase in radius effected by the flattening of the flywheel causes the centrifugal stress to be applied to the flywheel in a circumferential direction while essentially eliminating any radial elongation and thus obviating any circumferential delamination of the flywheel. The flywheel may be constructed of isotropic, composite, or combination of isotropic and composite materials.

DESCRIPTION OF THE PREFERRED EMBODIMENT

Figure 1:
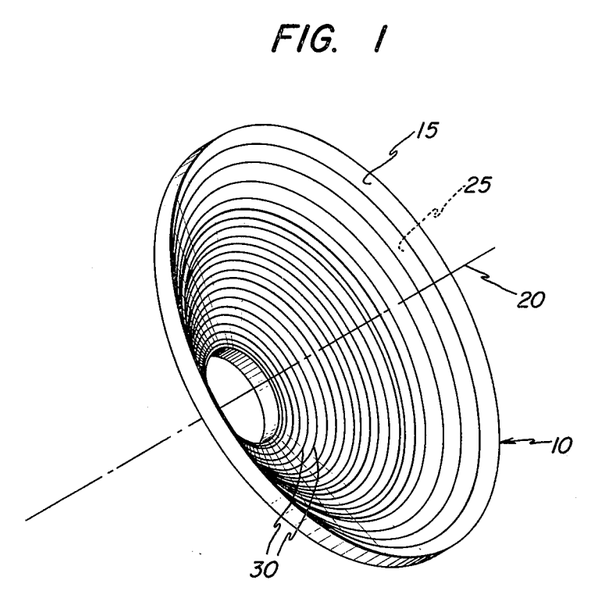
FIG. 1 is a three-dimensional view of a concave embodiment of the flywheel of the present invention.
Figure 7:
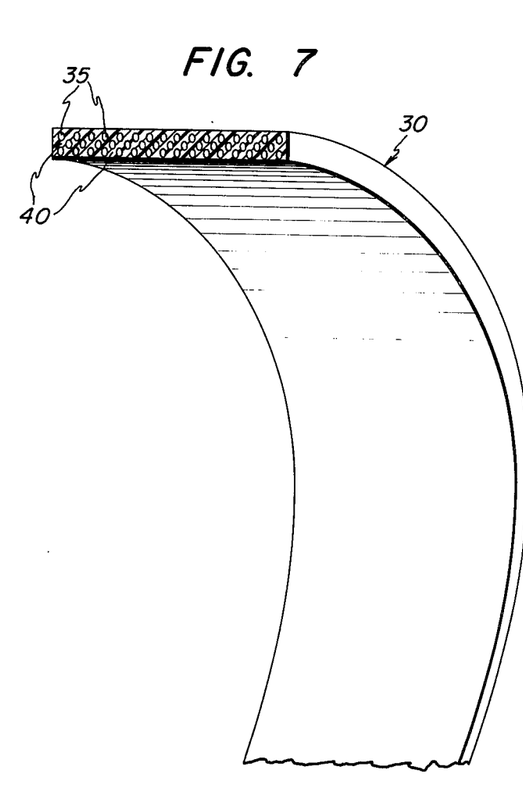
FIG. 7 is an enlarged view in cross-section of a tape that may be employed in the fabrication of a flywheel of the present invention.

FIG. 1 illustrates a shaped disc flywheel 10 a first curved major surface 15 of which is generally symmetrically concave about the axis of rotation 20. The second major curved surface 25 of flywheel 10 is generally spaced from the first major surface 15 being symmetrically convex about axis of rotation 20. Major surfaces 15 and 25 may include generally flat hub portions 27 and 28 respectively, disposed at the centers thereof (See FIG. 2). Shaped disc flywheel 10 may be formed from an isotropic material, or as illustrated here, wound from tapes (or roving) 30 comprising a multiplicity of parallel glass or similar fibers 35 disposed in a matrix of epoxy resin, elastomer, or other suitable binder material 40 (see FIG. 7).

Prior art composite flywheels are frequently fabricated by winding tapes formed from a multiplicity of glass or similar fibers disposed within a matrix of binder material. However, such prior art flywheels are formed in flat cylindrical disc or ring shapes and are plagued with a propensity to delaminate in a circumferential direction when rotated at the high speeds required for the high density storage of requisite amounts of energy. When such a prior art flywheel is spun under conditions of normal operation, centrifugal forces within the flywheel due to the rotation of the flywheel itself, are directed in the radial direction. Therefore, since the fibers of such prior art flywheels are oriented circumferentially, it will be appreciated that the matrix material and fibers are required to carry the centrifugal load in a direction perpendicular to the axes of the fibers. However, some of the most popular materials from which fibers employed in composite flywheels are formed are stronger in a direction along the axis of the fiber than in a direction perpendicular to the axis of the fiber. Therefore, the composites employed in such prior art constructions are required to carry a large portion of the centrifugal load in a direction other than that in which they are strongest. Moreover, the matrix material and the bonding interface between the matrix and the fiber surfaces is placed in tension by the centrifugal loading within the flywheel and, since such a binder and the bonding interface is relatively weak as compared to the axial strength of the fibers, these prior art flywheels often fail by delamination at localities of the binder when rotated at the high rotational speeds necessary for the storage of requisite amounts of energy.

Figure 2:
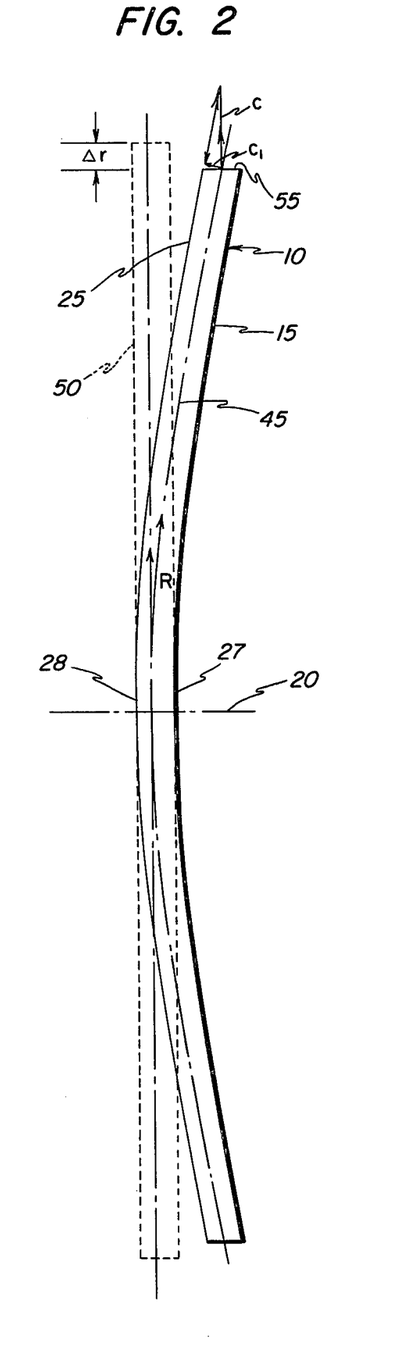
FIG. 2 is a side view of the concave flywheel of the present invention showing the shapes the flywheel assumes in both the static and rotational modes.

These deficiencies of prior art composite flywheels are overcome by properly shaping composite flywheels according to the present invention as further illustrated in FIGS. 2, 3, 4, 5 and 6. Referring specifically to FIG. 2, the flywheel or flywheel module 10 of the present invention is shaped such that one major surface 15 is symmetrically concave about axis of rotation 20 while the other major surface 25 is spaced from surface 15 and is symmetrically convex about that axis. In other words, all points of the outer edge of flywheel 10 are unidirectionally and equally spaced from a plane normal to the axis of rotation 20 and passing through the geometric center of the flywheel. In the preferred embodiment, surface 25 is spaced equidistant from surface 15 over the entire area of the surfaces so that a high energy flywheel may be constructed from a plurality of interfitting modules. However, where a modular construction is not desired, surface 25 need not be spaced equidistant from surface 15 over the entire area of the surfaces. When flywheel 10 is rotated, centrifugal force will act on the flywheel in a radially outward direction (transverse to axis of rotation 20) as indicated by arrow C. As will be appreciated, the centrifugal force acting upon the flywheel 10 and represented by arrow C may be broken down into components one of which, as indicated by arrow $C_1$, being in a direction perpendicular to midplane or neutral axis 45 of the flywheel. Flywheel 10 is of sufficient flexibility, such that this component $C_1$ of the centrifugal force acting upon flywheel 10 will cause the radial section of the flywheel to bend (to the left as shown in FIG. 2) thereby causing the flywheel to flatten as the speed of rotation increases. All points of the outer edge of flywheel 60 are unidirectionally and equally spaced from a plane normal to the axis of rotation and passing through the geometric center of the flywheel. This generally flatter shape which flywheel 10 assumes upon high speed rotation is shown by phantom lines in FIG. 2 at 50.

As will be appreciated, as flywheel 10 flattens upon rotation at a velocity sufficient to cause the flywheel to store requisite amounts of energy, the radial distance perpendicular to the axis of rotation 20 between the axis and the outer rim 55 of flywheel 10 will increase by a length indicated as $\Delta r$ in FIG. 2. Included in length $\Delta r$, are the radially outward displacements of all the incremental annular elements of flywheel 10 disposed radially outward of the flat hub portion. By designing flywheel 10 such that the radius of the flywheel upon reaching the maximum speed of rotation is equal to the developed radial length (R) of the flywheel measured along mid-plane axis 45, no overall radial strain will be induced within the flywheel 10 due to centrifugal stress.

That is, the centrifugal forces within flywheel 10 will be carried by the circumferential fibers in circumferential directions, the increase in radius of each incremental element due to the flattening of the flywheel upon rotation, obviating any overall radial elongation (strain) of the flywheel. As the overall radial elongation or strain within the flywheel is eliminated, the overall radial stress within the flywheel will also be eliminated as long as the flywheel is rotated at a speed less than that at which portions of the flywheel actually become flat.

Therefore, the stresses induced by the centrifugal force acting upon the flywheel will be accommodated by the circumferentially wound fibers 35 in their lengthwise direction, that direction in which they are strongest. Moreover, the binder 40 within which fibers 35 are disposed will not be placed in overall radial tension, thereby obviating the risk of a circumferential delamination of the flywheel at the localities of the binder between the fibers. It has been determined that these superior results may be achieved when the initial shape of the neutral axis of the flywheel is characterized approximately by the expression:

$$Y_m = Y_{m-1} + \frac{R_o}{n} \text{SIN ARCCOS} \left[ 1 - K \left(\frac{R_o}{n}\right)^2 \{m^3 - (m-1)^3\} \right] \text{ wherein } K = \frac{\delta\omega^2}{gE}$$

$Y_m$ is the location of the point being considered for analysis measured along the axis of rotation from the geometric center of the flywheel.

$Y_{m-1}$ is the location of the immediately previous point having been considered for analysis measured along the axis of rotation from the geometric center of the flywheel.

$\delta$ is the density of the flywheel material.

$\omega$ is the full design rotational speed of the flywheel.

$g$ is the acceleration of gravity.

$E$ is the modulus of elasticity of the flywheel material in a circumferential direction.

$R_o$ is the radius of the flywheel when rotating in a flattened condition at design speed $\omega$.

$n$ is the total number of points to be considered for analysis and $m$ is the total number of points having been considered up to and including the point presently being considered.

Figure 3:
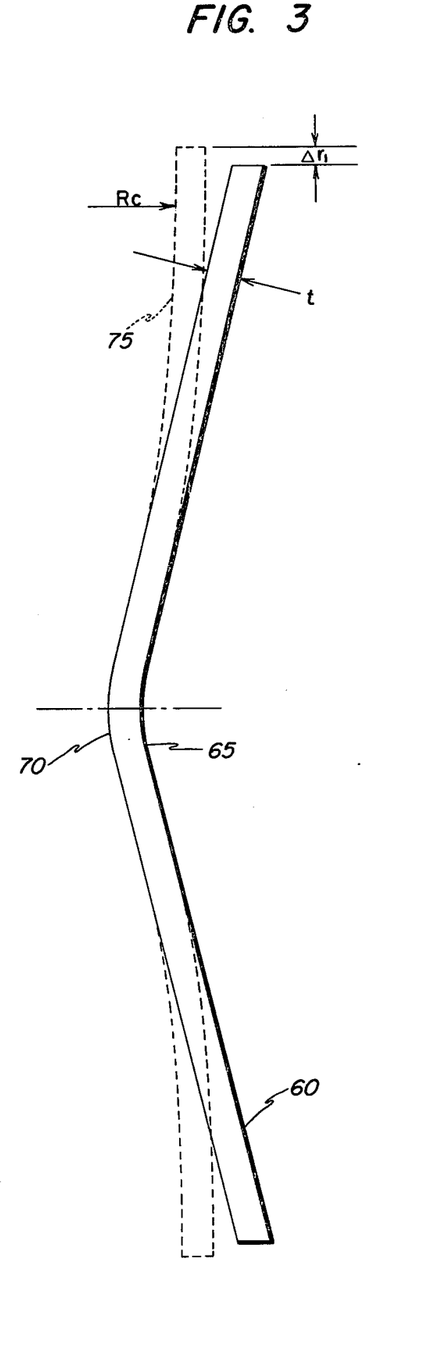
FIG. 3 is a side view of an alternate conical embodiment of the flywheel of the present invention showing the shapes the flywheel assumes in both the static and rotational modes.

FIG. 3 shows an alternate embodiment of the flywheel of the present invention. Flywheel 60 includes inner and outer conically shaped major surfaces 65 and 70 which, upon rotation of flywheel 60 at a predetermined speed necessary to store a requisite amount of energy, assume a displacement as indicated by the phantom line representation of flywheel 60 shown at 75. As the flywheel flattens, at least significant portions of the flywheel approach the aforementioned plane. As in the case of the shaped disc composite flywheel 10 shown in FIG. 2, upon rotation, flywheel 60 will tend to flatten with a resultant increase ($\Delta r_1$) in the radius of the flywheel measured perpendicular to the axis of rotation. As the flywheel flattens, at least significant portions of the flywheel approach the aforementioned plane. At speeds below that at which the rim of the flywheel becomes flat, this radial increase in distance accommodates any centrifugal force acting on the flywheel in the manner described in connection with flywheel 10 shown in FIG. 2, thereby eliminating any overall radial strain within the flywheel and obviating any circumferential delamination of the flywheel due to centrifugal radial stresses.

The flattening of the shaped disc as speeds of rotation are increased also results in bending of the radially outward sections of the discs illustrated in FIGS. 1, 2 and 3. The amount of bending needed to accomplish a given amount of increase in radius is a funtion of the angle of the surface to a perpendicular of the axis of rotation (when stationary) at the point being considered. The radius of curvature $R_c$ (FIG. 3) is characteristic of the amount of bending involved and, together with thickness $t$ of the disc (FIG. 3) and the stiffness modulus of the composite in the radial direction $E_r$ (perpendicular to the circumferential fibers of the composite) determines the maximum radial and compressive stresses at the surfaces 65 and 70 of the disc. The bending stress $S_b$ in a portion of the disc of a particular radius of curvature is determined by the following formula.

$$S_b = \frac{E_r}{R_c} \left(\frac{t}{2}\right)$$

Therefore, it must be appreciated that the thickness of the disc for a given upper limit of $R_c$ will be limited by the maximum allowable bending stress of the disc. In composite discs, this maximum allowable bending stress in most instances will be that of the matrix material. For a given disc diameter and speed, fiber strength and matrix strength, the mass needed to provide the desired energy storage may then be obtained by stacking together the necessary number of shaped discs shown in FIGS. 2 and 3, hereinafter referred to as disc modules.

Figure 4:
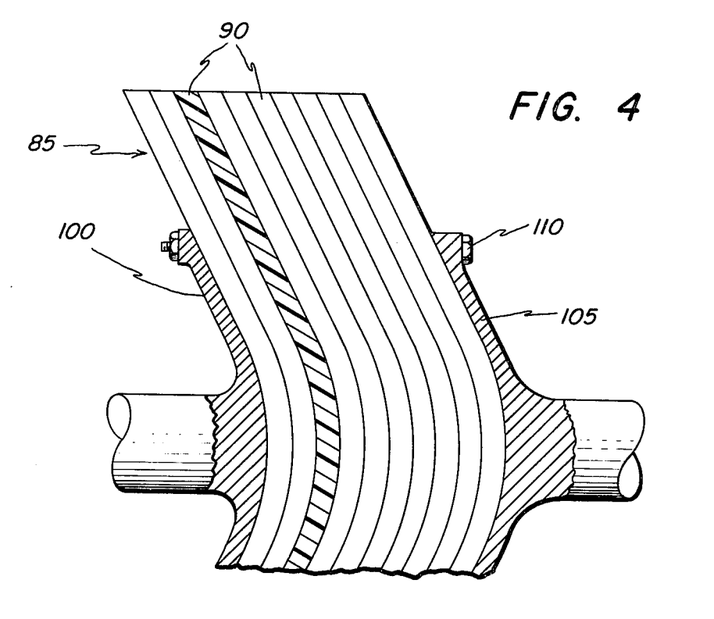
FIG. 4 is a side view partially sectioned and broken away of a high energy flywheel constructed in accordance with the present invention.
Figure 5:
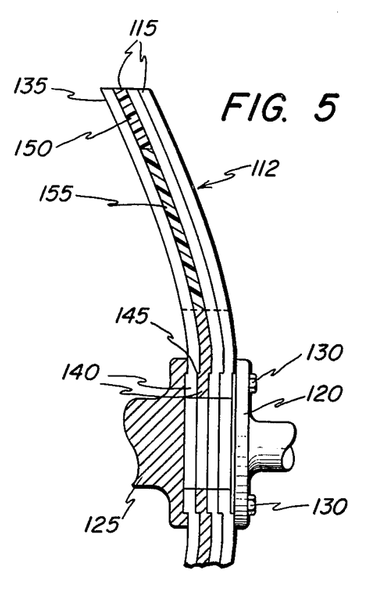
FIG. 5 is a side view partially sectioned and broken away of an alternate embodiment of a high energy flywheel constructed in accordance with the present invention.
Figure 6:
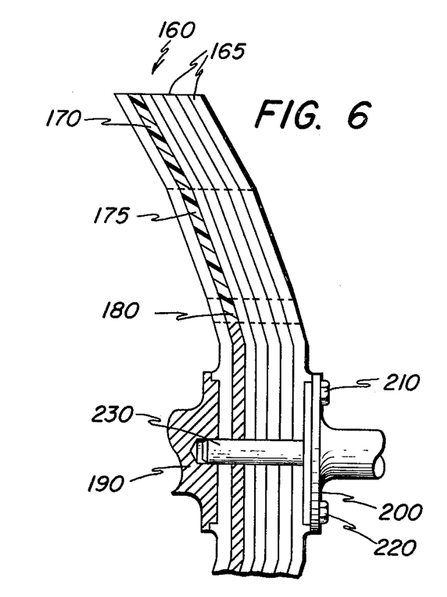
FIG. 6 is a side view partially sectioned and broken away of a second alternate embodiment of a high energy flywheel constructed in accordance with the present invention.

FIGS. 4, 5 and 6 illustrate the stacking of a plurality of disc modules to achieve the mass needed for a desired capability of energy storage. Referring specifically to FIG. 4, there is shown a high energy flywheel 85 comprising a plurality of stacked conical disc modules 90 such as the module shown in FIG. 3. Modules 90 interfit between two generally conically shaped coupling members 100 and 105 which are fixed together as by bolts one of which is shown at 110. While ten shaped disc conical modules are shown in FIG. 4, it will be understood that more or less many be employed as may be required for the desired energy storing capacity.

FIG. 5 illustrates a high energy flywheel 110 formed from a plurality of curved disc modules 115 similar to the module illustrated in FIG. 2. Shaped disc modules 115 are fixed together by coupling members 120 and 125 bolted together as at 130. Modules 115 include curved radially outer portions 135 and hollow flat hub portions 140. The elimination of any significant radial transfer of centrifugal force from the outer portions of the rotating flywheel to the inner hub portions results in the inner portions being required to carry only those radial centrifugal forces which are generated by the mass of the hub itself. By limiting the extent of the outside diameter of these hub portions these stress levels within the hub portions may be limited to acceptably low values even at the highest speeds of flywheel rotation. These low stress levels in the hubs or central portions permit axial bolt holes to be placed therethrough without risk of any appreciable weakening of the flywheel and assuring complete torque transmission through the coupling members. Moreover, these low stress levels in the hub portions permit the manufacture of the hub from steel and the rabbetting of the hub portions as at 145 to assure a complete concentricity of the flywheel modules and thus dynamic balance of the flywheel at all operating speeds. Furthermore, since energy storage per pound of weight is very inefficient at small distances from the center of the flywheel, this less useful weight may be eliminated from the flywheel by employing hollow hub members 140.

As hereinabove set forth, the increase in radius of the modules 115 due to the flattening of the flywheel is the result of an increase in radius of each of the incremental annular elements forming the modules. This increase in radius of each incremental element is inversely proportional to the specific stiffness (the quotient of the modulus of elasticity in a circumferential direction divided by the density) of the incremental element.

Therefore, the integrity of a flywheel constructed in accordance with the present invention may be preserved (insuring an identical increase in radius of each incremental annular element) by employing a number of different materials having the same specific stiffness. Such a construction is illustrated in FIG. 5 wherein the radially outer portion 135 of each module is formed from a rim 150 of a first material and an annular portion 155 disposed radially outward from hub portion 140. The maximum energy storage capability will be determined by the specific strength (quotient of strength divided by density) of the material forming rim 150. Therefore, lower cost or higher density materials may then be employed in other locations of each module such as annular portion 155 and hub portion 140 to achieve an optimal energy storage capability per unit cost, per unit weight or per unit volume as may be preferred in any flywheel application.

FIG. 6 illustrates an alternate embodiment of a high energy flywheel 160 comprising a plurality of shaped moudles 165 each including a plurality of conic portions of varying conic angle as measured from a perpendicular to the centerline or axis of rotation. These portions are shown at 170 (conic angle of approximately 30°), 175 (conic angle of approximately 22°) and 180 (conic angle of approximately 15°). Due to the stress distribution whereby the highest stress is carried by the radially outermost portion of the flywheel and the lowest stress is carried at the radially inner portions of the flywheel, smaller conic angles are sufficient to eliminate overall radially directed centrifugal stress at the radially inner portions than at the radially outer portions of each module. As discussed hereinabove, each module 165 may be formed from a radial distribution of a plurality of materials having similar specific stiffnesses. As the number of portions having varying conic angles are increased, the modules 165 may approximate the curved modules 115 illustrated in FIG. 5 or modules or other curvatures such as spherical or elliptacle curvatures. The modules 165 are fixed together by coupling members 190 and 200 bolted together as at 210 and 220. As previously set forth, the elimination of overall radial centrifugal stress in the flywheel of the present invention allows the flywheel or the modules from which it is constructed to be manufactured with hollow hub portions. Flywheel 160 is provided with such a hollow hub portion, pin 230 fixed to coupling member 200 being disposed within the hollow hub portion to ensure the complete concentricity of the modules 165 and dynamic balance of the entire flywheel.

The shaped disc flywheel of the present invention may be manufactured from an isotropic material or a combination of isotropic materials such as metals, ceramics or organic materials or may be formed from composites. When formed from composites, the flywheel or the modules forming the flywheel are manufactured by a layup of a multiplicity of fibers preimpregnated with a partially cured binder as either roving or commercially available tapes. In the preferred embodiment, the flywheel of the present invention is formed from a layup of commercially available tapes of glass fibers 35 disposed in a monolithic matrix 40 of partially cured epoxy resin (See FIG. 7). In addition to glass fibers, fibers of metallic material, ceramics, or organic materials may also be employed. Besides epoxy, the binder or matrix may be formed from metals, elastomers, ceramics or plastics.

Figure 8:
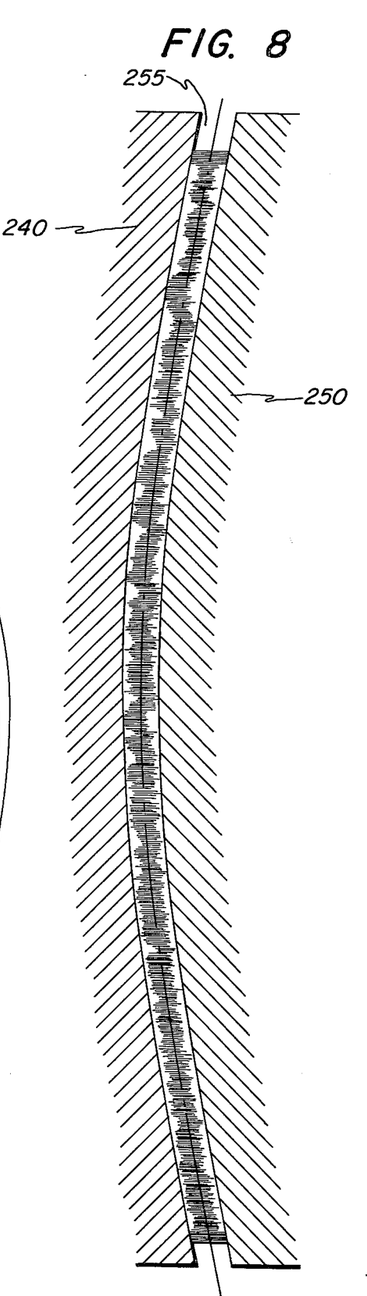
FIG. 8 is a cross-sectional view of a flywheel being constructed in accordance with the present invention and apparatus employed therefor.

When the flywheel or modules forming the flywheels of the present invention are manufactured from a layup of composite tapes, the following methods may be employed. Referring to FIG. 8, there are shown two dies 240 and 250, the inner surfaces of which conform to the desired shape of the module or flywheel being constructed. The composite tape 30 is wound under tension from the center outwardly within space 255 between dies 240 and 250 forming a member of the desired shape. This member is then subjected to heat and pressure to fully cure the binder transforming the layers of binder (tape) into a monolithic unit. Alternatively, the tapes may be wound into a flat disc, this flat disc then being pressed (before a curing) by dies 240 and 250 causing the tape layers to slide with respect to each other into positions corresponding to the desired shape. The resulting structure may then be fully cured with heat and pressure causing the layers of binder to be formed into a monolithic unit.

Figure 9:
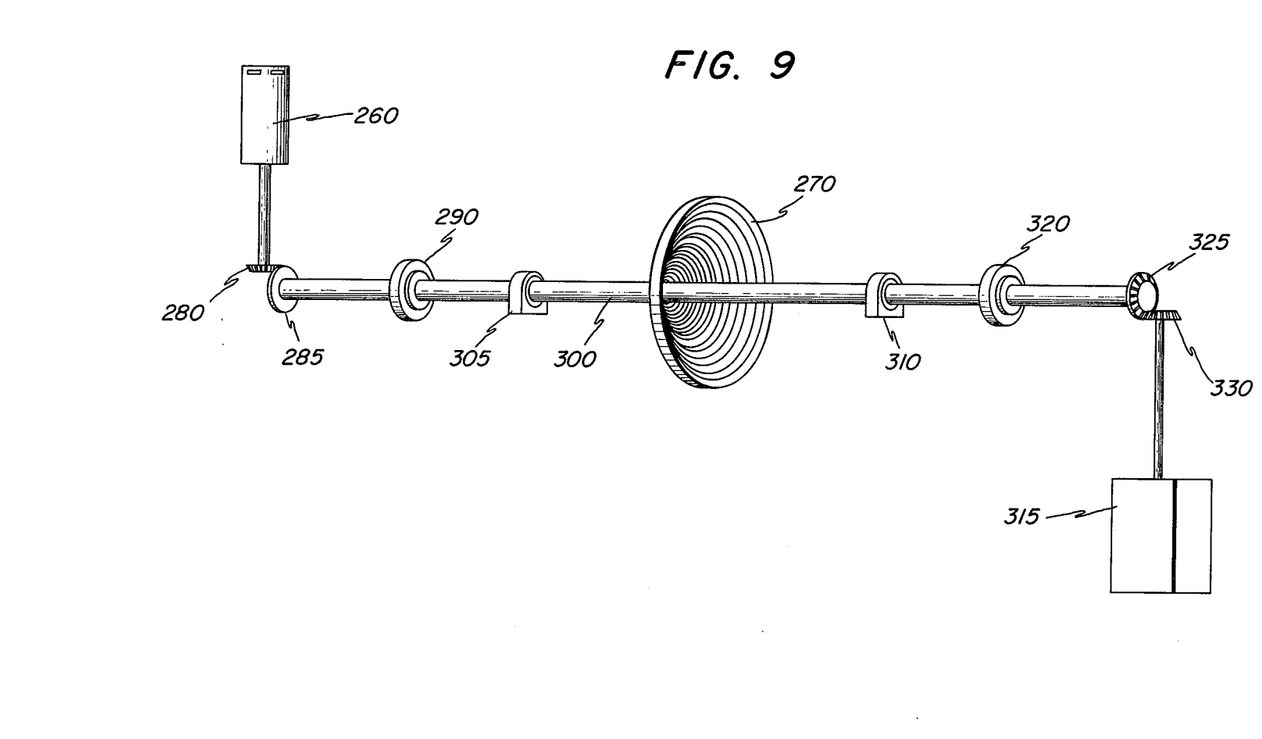
FIG. 9 is a view of a flywheel energy storage system emplying the shaped disk flywheel of the present invention.

The flywheel of the present invention may be employed in any environment where it is desirable to store quantities of energy. Referring to FIG. 9, a flywheel energy storage system is shown comprising a means of energizing a flywheel, the flywheel, and a means of selectively removing energy from the flywheel. A motor 260 or other suitable prime mover drives a shaped disc flywheel 270 through bevel gears 280 and 285 and clutch 290. Flywheel 270 is fixed to a shaft 300 supported on bearings 305 and 310. The energy stored by flywheel 270 may be used to drive any apparatus shown at 315 such as, for example a transportation vehicle. Energy may be transmitted from flywheel 270 to appartus 315 as by a second clutch 320 and bevel gears 325 and 330.

It can be seen then that the shaped disc flywheel of the present invention overcomes the deficiencies of prior art isotropic and composite flywheels. The elimination of overall radial strain, and thus radial stress, minimizes the risk of circumferential delamination of the composite flywheel and enables the fibers from which such a flywheel is formed to carry the dynamic loading in a circumferential direction, (parallel to the axes of the fibers), the direction of greatest strength. The fabrication of the flywheel of the present invention may be automated, the flywheel being formed in only a minimum number of steps. The use of commercially available preimpregnated fiber tapes or strands make the fabrication process simple and economical.

While there have been shown and described a number of specific embodiments of the shaped disc flywheel of the present invention and processes for forming that flywheel, it will be apparent to those skilled in the art that modifications may be made without departing from the substance of this invention and it is intended by the appended claims to cover such modifications as come within the spirit and scope of this invention.

What is claimed is:

1. A flywheel, a first major surface of said flywheel being symmetrically concave about the axis of rotation of said flywheel and a second major surface of said flywheel being spaced from said first major surface and being symmetrically convex about said axis of rotation, said flywheel being of sufficient flexibility and so constructed and arranged that when rotated at a predetermined speed said flywheel assumes a generally flatter shape, such that at least significant portions of said first and second major surfaces approach positions substantially perpendicular to said axis of rotation with an accompanying increase in radius measured perpendicularly from the axis of rotation to the outer rim of the flywheel thereby circumferentially accommodating the centrifugal force acting on the flywheel and substantially eliminating any overall radial centrifugal stress within said flywheel.

2. The flywheel of claim 1 wherein said second major surface of said flywheel is spaced generally equidistant from said first major surface.

3. The flywheel of claim 2 wherein said flywheel comprises a plurality of interfitting modules, each of said modules including a first major surface being symmetrically concave about the axis of rotation of said flywheel and a second major surface being spaced generally equidistant from said first major surface and being symmetrically convex about said axis of rotation.

4. The flywheel of claim 3 wherein said modules are bolted together, and wherein each module includes a hollow hub portion.

5. The flywheel of claim 4 wherein said modules are rabbetted together.

6. The flywheel of claim 1, the initial shape of the neutral axis of the flywheel being characterized approximately by the expression $$Y_m = Y_{m-1} + \frac{R_o}{n} \text{ SIN ARCCOS}\left[1 - K\left(\frac{R_o}{n}\right)^2 \{m^3 - (m-1)^3\}\right] \text{ and } K = \frac{\delta\omega^2}{gE}$$

wherein
- $Y_m$ is the location of the point being considered for analysis measured along the axis of rotation from the geometric center of the flywheel,
- $Y_{m-1}$ is the location of the immediately previous point having been considered for analysis measured along the axis of rotation from the geometric center of the flywheel,
- $\delta$ is the density of the flywheel material,
- $\omega$ is the full design rotational speed of the flywheel,
- $g$ is the acceleration of gravity,
- $E$ is the modulus of elasticity of the flywheel material in a circumferential direction,
- $R_o$ is the radius of the flywheel when rotating in a flattened condition at design speed $\omega$,
- $n$ is the total number of points to be considered for analysis and
- $m$ is the number of points having been considered up to and including the point presently being considered.

7. The flywheel of claim 1 wherein said flywheel is formed from a multiplicity of generally circumferentially extending parallel adjacent fibers impregnated with a binder.

8. The flywheel of claim 6 wherein said fibers are metallic.

9. The flywheel of claim 6 wherein said fibers are of glass.

10. The flywheel of claim 6 wherein said fibers are of ceramic.

11. The flywheel of claim 6 wherein said fibers are of an organic material.

12. The flywheel of claim 6 wherein said binder is an epoxy resin.

13. The flywheel of claim 6 wherein said binder is metallic.

14. The flywheel of claim 6 wherein said binder is an elastomer.

15. The flywheel of claim 6 wherein said binder is a ceramic.

16. The flywheel of claim 6 wherein said binder is a plastic.

17. A flywheel, said flywheel when in a static condition comprising at least one annular portion, each annular portion having generally conically shaped inner and outer major surfaces and being concentric to adjacent annular portions, said flywheel being of sufficient flexibility and so constructed and arranged that when rotated at a predetermined speed, said flywheel assumes a shape described by the movement of said inner and outer major surfaces radially outward and in a direction generally parallel to the axis of rotation of said flywheel.

18. The flywheel of claim 17 wherein said flywheel comprises a plurality of interfitting modules, each having at least one annular portion, each annular portion being generally conical in shape and concentric to adjacent annular portions.

19. The flywheel of claim 17 wherein said flywheel is formed from a multiplicity of generally circumferentially extending parallel adjacent fibers impregnated with a binder.

20. The flywheel of claim 19 wherein said fibers are metallic.

21. The flywheel of claim 19 wherein said fibers are of glass.

22. The flywheel of claim 19 wherein said fibers are of ceramic.

23. The flywheel of claim 19 wherein said fibers are of an organic material.

24. The flywheel of claim 19 wherein said binder is metallic.

25. The flywheel of claim 19 wherein said binder is an elastomer.

26. The flywheel of claim 19 wherein said binder is an epoxy resin.

27. The flywheel of claim 19 wherein said binder is a ceramic.

28. The flywheel of claim 19 wherein said binder is a plastic.

29. In a flywheel energy storage system including a flywheel, means for energizing said flywheel, and means for transmitting energy stored by said flywheel to an apparatus, the improvement comprising:

said flywheel having a first major surface symmetrically concave about the axis of rotation of said flywheel and a second major surface spaced from said first major surface and being symmetrically convex about said axis of rotation, said flywheel being of sufficient flexibility and so constructed and arranged that when rotated at a predetermined speed, said flywheel assumes a generally flatter shape such that at least significant portions of said first and second major surfaces tend to approach positions substantially perpendicular to said axis of rotation with an accompanying increase in radius measured perpendicularly from the axis of rotation to the outer rim of the flywheel thereby circumferentially accommodating the centrifugal force acting on the flywheel and substantially eliminating any overall radial centrifugal stress within said flywheel.

30. The apparatus of claim 29 wherein said second major surface is spaced equidistant from said first major surface.

31. The apparatus of claim 30 wherein said flywheel comprises a plurality of interfitting modules, each of said modules including a first major surface symmetrically concave about the axis of rotation of said flywheel and a second major surface being spaced generally equidistant from said first major surface and being symmetrically convex about said axis of rotation.

32. The apparatus of claim 29 wherein said flywheel is formed from a multiplicity of generally circumferentially extending parallel adjacent fibers impregnated with a binder.

33. A flywheel energy storage system including a flywheel, means for energizing said flywheel and means for transmitting energy stored by said flywheel to an apparatus, the improvement comprising:

said flywheel when in a static condition comprising at least one annular portion, each annular portion having generally conically shaped inner and outer major surfaces and being concentric to adjacent annular portions, said flywheel being of sufficient flexibility and so constructed and arranged that when rotated at a predetermined speed, said flywheel assumes a shape described by the movement of said inner and outer major surfaces radially outward and in a direction generally parallel to the axis of rotation of said flywheel.

34. The apparatus of claim 33 wherein said flywheel comprises a plurality of interfitting modules, each having at least one annular portion, each annular portion being generally conical in shape and concentric to adjacent annular portions.

35. The apparatus of claim 33 wherein said flywheel is formed from a multiplicity of generally circumferentially extending parallel adjacent fibers impregnated with a binder.

36. A flywheel, said flywheel being symmetric about an axis of rotation thereof, all points of the radially outer edge of said flywheel being unidirectionally and equally spaced from a plane normal to the axis of rotation and passing through the geometric center of said flywheel, said flywheel being of sufficient flexibility and so constructed and arranged that when rotated above a predetermined speed, said flywheel assumes a generally flatter shape, such that at least significant portions of said flywheel approach said plane with an accompanying increase in radius measured perpendicularly from the axis of rotation thereby circumferentially accommodating the centrifugal force acting on the flywheel and substantially eliminating any overall radial centrifugal stress within said flywheel.

37. The flywheel of claim 36 wherein said flywheel comprises a plurality of interfitting modules each being symmetric about said axis of rotation.

38. The flywheel of claim 36, the initial shape of the neutral axis of the flywheel being characterized approximately by the expression $$Y_m = Y_{m-1} + \frac{R_o}{n} \text{SIN ARCCOS} \left[ 1 - K \left(\frac{R_o}{n}\right)^2 \{m^3 - (m-1)^3\} \right] \text{ and } K = \frac{\delta\omega^2}{gE}$$

wherein $Y_m$ is the location of the point being considered for analysis measured along the axis of rotation from the geometric center of the flywheel, $Y_{m-1}$ is the location of the immediately previous point having been considered for analysis measured along the axis of rotation from the geometric center of the flywheel, $\delta$ is the density of the flywheel material, $\omega$ is the full design rotational speed of the flywheel, $g$ is the acceleration of gravity, $E$ is the modulus of elasticity of the flywheel material in a circumferential direction, $R_o$ is the radius of the flywheel when rotating in a flattened condition at design speed $\omega$.

$n$ is the total number of points to be considered for analysis and $m$ is the number of points having been considered up to and including the point presently being considered.

39. The flywheel of claim 36, said flywheel when in a static condition comprising at least one annular portion, each annular portion being generally frustroconically shaped and symmetric about said axis of rotation.

* * * * *